Oct. 1, 1935.  H. B. WATKINS  2,016,188
PROJECTOR
Filed July 27, 1934   4 Sheets-Sheet 1

INVENTOR
HENRY B. WATKINS.
BY
ATTORNEYS

Oct. 1, 1935.  H. B. WATKINS  2,016,188
PROJECTOR
Filed July 27, 1934    4 Sheets-Sheet 2
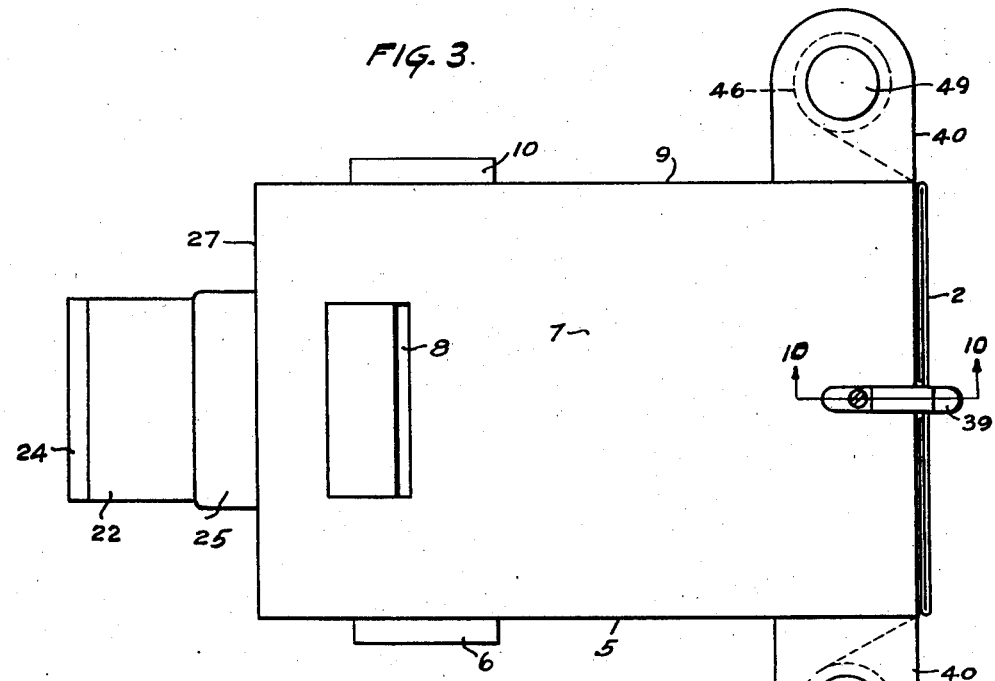
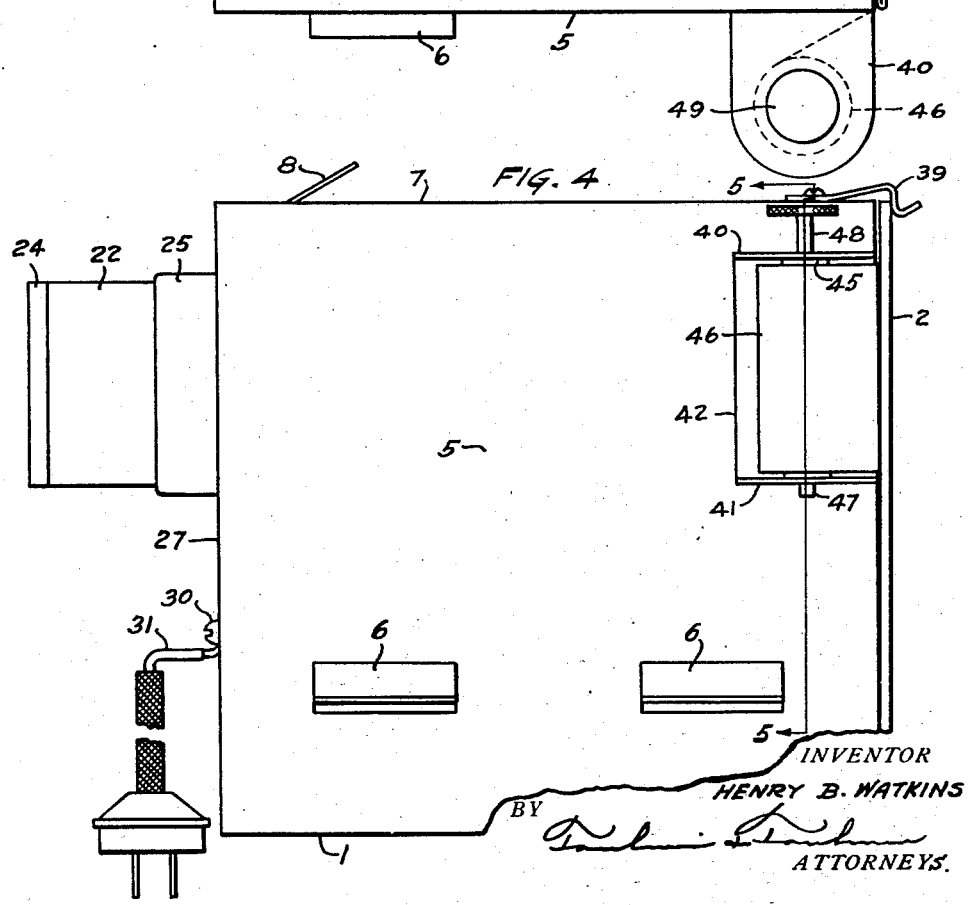
INVENTOR
HENRY B. WATKINS.
BY
ATTORNEYS.

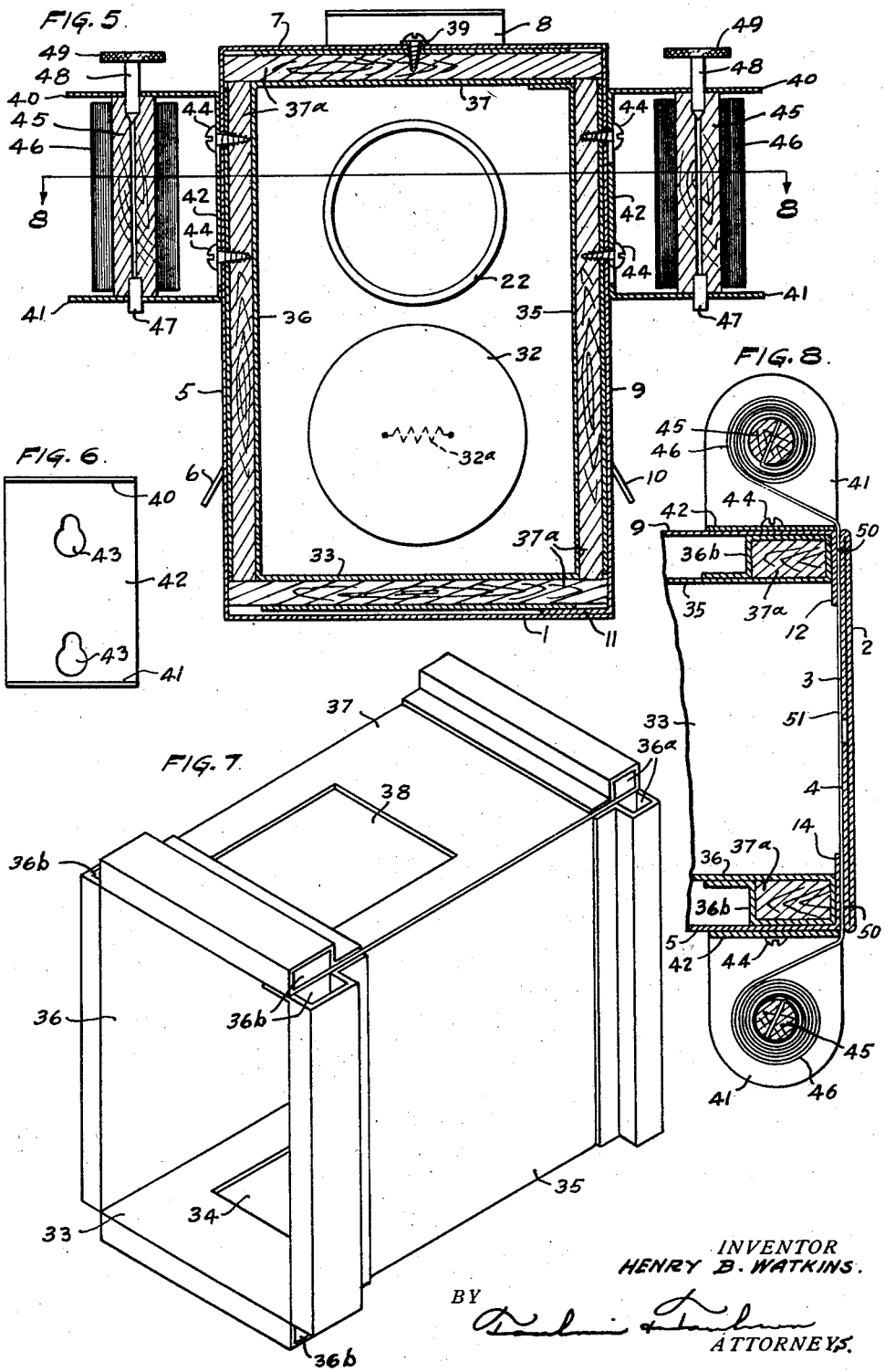

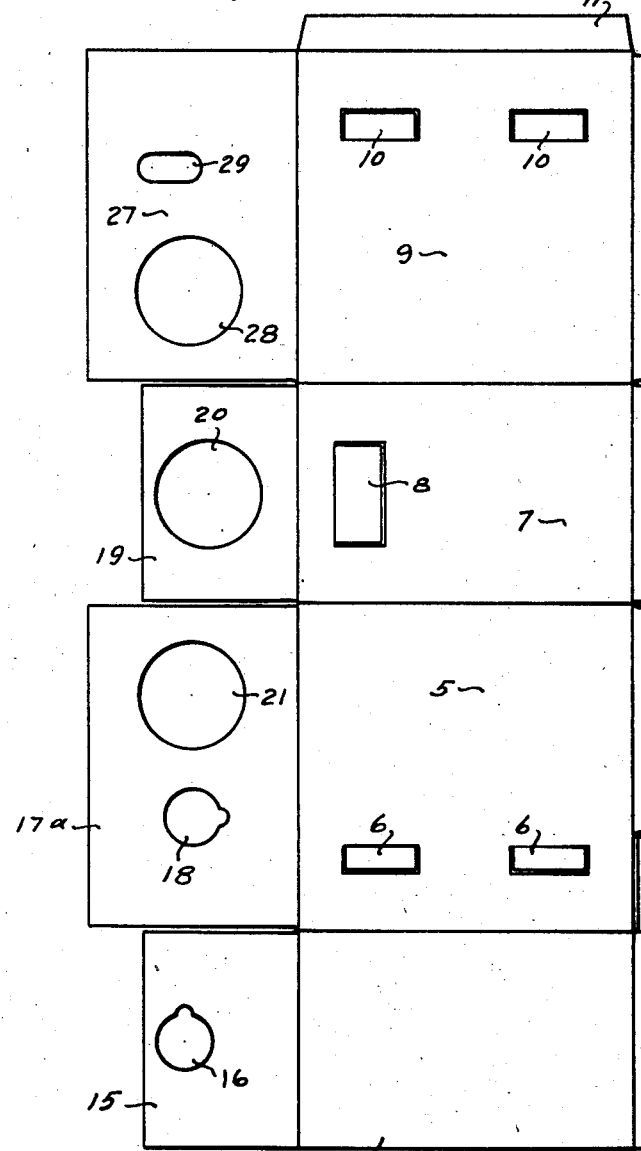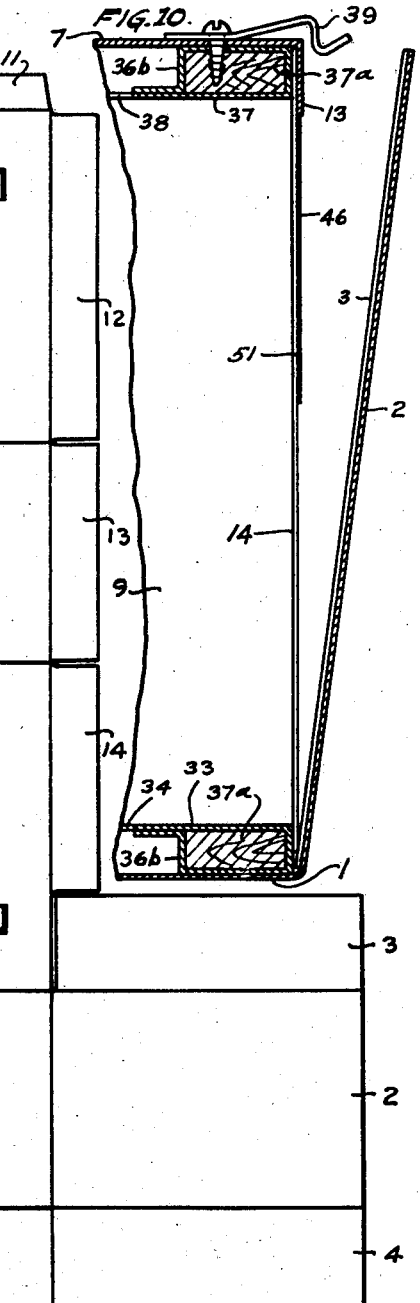

Patented Oct. 1, 1935

2,016,188

UNITED STATES PATENT OFFICE 2,016,188

PROJECTOR

Henry B. Watkins, Columbus, Ohio, assignor to The Kilgore Mfg. Company, Westerville, Ohio, a corporation of Ohio Application July 27, 1934, Serial No. 737,272

9 Claims. (Cl. 88—24)

My invention relates to a means and method of projecting reflected images from a stationary or intermittently-moving series of pictures in order to give substantially the effect of moving pictures.

It is a further object to provide a projector and a film that is fireproof, that is self-cooling and of such simple construction that it may be made at low cost without sacrificing a satisfactory result.

It is a further object to provide means for easily and quickly providing opaque films that will not be burnt or discolored by the projection light, which may be quickly and easily operated, which are non-inflammable and which may be regulated in a speed according to the mentality of the persons viewing the reflected images from the film.

It is a further object to provide a construction preferably made of pasteboard, which may be manufactured in flat form and assembled at will into a composite structure; and despite being made of pasteboard or similar materials, it will be sufficiently fireproof and self-cooling as to permit of the projection light being continuously run in it for an indefinite period of time without overheating the projecting box, without injuring the projecting lens and without disturbing the film from which the images are being reflected.

It is a further object to provide such a projector which completely eliminates mirrors, which may be used on any type of current and which will utilize an electric bulb of relatively small capacity and low current consumption.

It is my particular object to provide a projector that is entirely safe for children, that can be operated by a child or operated in school rooms, and which will be of such very low cost that it can be afforded by almost anyone.

It is a further object to provide films of a wide variety with a single projector, such films being so simply mounted and demounted that a child can operate the machine.

It is an object to provide an apparatus so constructed that the reflection of the image may be secured without an expensive light, mirrors or lenses and in a box employing the cheapest, simplest and lightest weight materials.

It is thus possible by my invention to reach a vast new class of children and persons for entertainment and educational purposes with a projector and films that may be manufactured at low cost in large quantities with all the advantages of safety, simplicity, light weight, etc., that have heretofore not been found in any projector, irrespective of its price.

Referring to the drawings:

Figure 3 is a top plan view of Figure 1;

Figure 4 is a side elevation of Figure 1;

Figure 5 is a section on the line 5—5 of Figure 4;

Figure 6 is a detail side elevation of the detachable bracket for supporting a film roll;

Figure 7 is an isometric perspective of the assembled blank showing the interior casing;

Figure 8 is a section on the line 8—8 of Figure 5;

Figure 9 is a plan view of the blank constituting the cover blank;

Figure 10 is a section on the line 10—10 of Figure 3.

Figure 1:
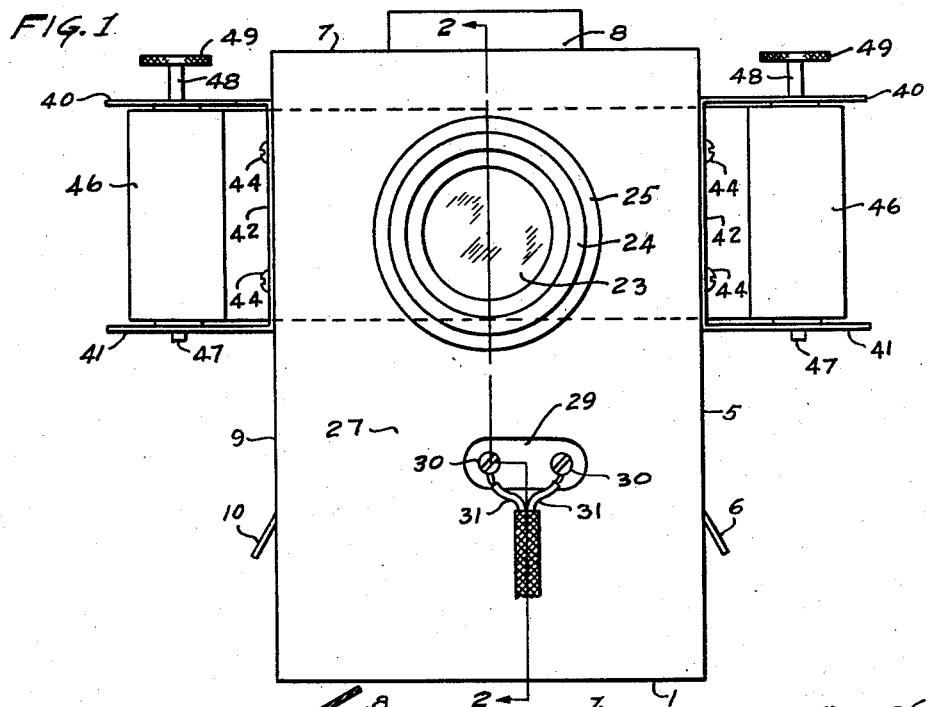
Figure 1 is a front elevation of the projector with the film in place.
Figure 2:
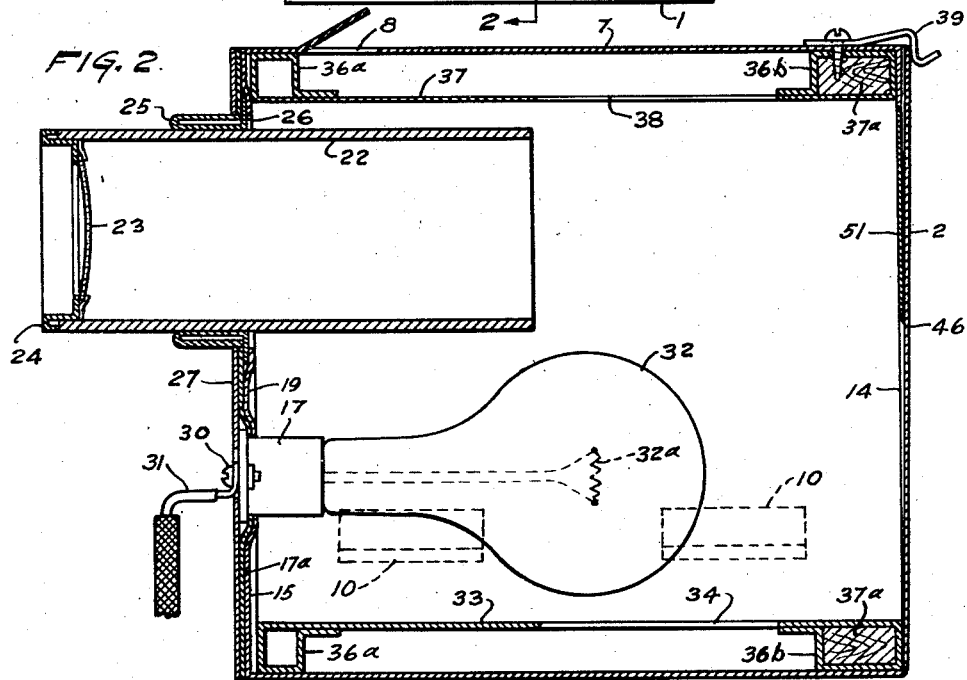
Figure 2 is a section on the line 2—2 of Figure 1.

The projector is made up of an outside cover casing having a hinged rear door and an inside spaced interior casing which is used to support the cover casing and acts in conjunction with the cover casing and the ventilation openings in the cover casing for circulating a cooling draft of air between the two casings and on the interior of the interior casing keeping the film, the lens and the lamp sufficiently cool to make the apparatus entirely safe irrespective of the fact that I prefer to make it of cardboard and wood in order to have it sufficiently cheap and light.

The film is preferably made of paper having a printed image thereon. A lens is provided in a slidable paper tube for focusing purposes. An electric lamp is mounted in the socket below the lens and below and in front of the film and generally between the rear end of the lens tube and the front of the film.

Specifically, the cover casing, as shown in Figure 9, is made of a single blank of such material as cardboard. This blank is composed of a bottom panel 1, which has hinged to its rear end the back door panel 2. The side flaps 3 and 4 are hinged thereto and folded inwardly upon the inside of the door panel to reinforce it. 5 designates one of the side panels having outwardly turned flaps 6 which serve as ventilation louvers. To the side panel 5 is hinged the top panel 7 having a ventilation louver 8. The top panel is hinged to the other side panel 9 having ventilation louvers 10. This panel 9 has a sealing flap 11. Its rear end is provided with a sealing flap 12 and similar sealing flaps 13 and 14 are hinged to the rear sides respectively of the top 7 and the side 5.

The front wall is composed of a panel 15 hinged to the bottom 1 and having an aperture 16 for receiving the lamp socket 17.

Overlapping this flap 15 on the outside of it is a second flap 17a having the lamp socket opening 18 coinciding with the opening 16. This panel 17a is hinged to the front edge of the side wall 5. Overlapping one-half of the panel 17a is a panel 19 having an aperture 20 coinciding with the aperture 21 in the panel 17a. These apertures receive the lens tube 22 which carries at its forward end a lens 23 in a lens collar 24. An annular metal sleeve 25 is mounted adjacent these apertures 20 and 21 for the purpose of slidably supporting with a broad bearing surface the tube 22. Such a member is turned over at 26 with a flange that is interposed between the flaps 17a and 19.

The third cover flap 27 is hinged to the forward end of the side wall 9 and has an aperture 28 coinciding with the apertures 20 and 21. It is also provided with an oblong aperture 29 which forms the restricted opening through which the terminals 30 for the electric wires 31 project. These terminals are mounted on the base of the lamp socket 17. Current is thus supplied to the lamp 32. Thus, the exterior casing, which is usually provided with some decorative impression on its exterior surface, is formed out of a single piece of stock and can be assembled into an integral structure by gluing the overlapping portions one to the other.

The next step is to provide the interior casing which is telescoped within the exterior casing. This interior casing consists of a bottom 33 having a ventilation opening 34, a side wall 35, a side wall 36 and a top 37 having a ventilation opening 38. The forward and rearward edges of this interior casing are provided with tube-like hollow portions 36a and 36b respectively. Within the tube-like portions 36b are placed the reenforcing members generally designated 37a and consisting of wooden sticks abutting one another. These cooperate with the tubes 36b to form spacers at the rear between the interior casing and the exterior casing so that air can circulate through the louvers 6 and 10 into the space between the top, bottom and sides of the two casings. The bottom opening 34 and top opening 38 of the interior casing permits air to circulate through that interior casing from the exterior and through the space between the two casings and thence finds its way out through the top louver 8.

Mounted upon the rear horizontal top corner of the box is a metal clip 39 for holding the door panel 2 in closed position.

Turning to the film and its support, there are mounted on the rear upper portions of the side walls U-shaped brackets consisting of metal plates having horizontal portions 40 and 41 and a slotted vertical portion 42 having bayonet joint slots 43 for engaging with the heads of the screws 44 which are mounted upon the upper rear sides of the box. These brackets support the wooden spindles 45 on which the film comprising a paper strip, having printed images and words, is wound. The film is designated 46. An axle 47 is provided at the bottom of the spindle 45 and a similar axle 48 terminating in a knurled hand button 49 is provided at the upper end of the spindle 45. By rotating these spindles through the hand buttons 49 the film can be drawn across the upper back portion of the box beneath the rear door 2 and against the ends of the box as at 50. The printed surface is thus exposed to the interior of the box at 51. The light in front of and below it projected on it from the bulb 32 having the filament 32a is reflected through the tube 22 and lens 23 upon a suitable wall or other display panel, upon which the reflected images appear. The speed of movement is determined by the operator according to the type of the audience. By suitably adjusting this speed the general effect of a moving picture can be secured especially when animated cartoons are printed upon the film in a succession of positions which, when exposed at a proper rate, give the impression of animated action of the characters so printed on the film.

It will be understood that the images on the film are presented up-side-down in the projector box so that they may be projected right-side-up.

As this film is printed on paper it can be reproduced in large quantities at very low cost so that a library of educational film or entertainment film can be supplied with this cheap projector giving a wide scope to the educational and entertainment advantages to such piece of apparatus within the reach of the ordinary pocketbook.

It will be understood that I desire to comprehend within my invention such modifications as may be necessary to adapt it to varying conditions and uses.

Having thus fully described my invention, what I claim as new and desire to secure by Letters Patent, is:

1. In a projection apparatus, a projector casing having ventilation openings and a false wall for the circulation of air therethrough, reenforcing means interposed between said projector casing and false wall to space said wall at either end thereof, a slidable lens tube and lens in the upper front wall thereof, a lamp located in said projector casing below and to the rear of the rear end of the lens tube and in front of and below a film, and a film supported behind the lamp and above it and behind the lens tube and in line with it.

2. In a projection apparatus, a projector casing having ventilation openings and a false wall for the circulation of air therethrough, reenforcing means interposed between said projector casing and false wall to space said wall at either end thereof, a slidable lens tube and lens in the upper front wall thereof, a lamp located in said projector casing below and to the rear of the rear end of the lens tube and in front of and below a film, a film supported behind the lamp and above it and behind the lens tube and in line with it, and means to actuate said film mounted on the exterior thereof on either side thereof.

3. In a projection apparatus, a projector casing having ventilation openings and a false wall for the circulation of air therethrough, reenforcing means interposed between said projector casing and false wall to space said wall at either end thereof, a slidable lens tube and lens in the upper front wall thereof, a lamp located in said projector casing below and to the rear of the rear end of the lens tube and in front of and below a film, a film supported behind the lamp and above it and behind the lens tube and in line with it, and means to actuate said film mounted on the exterior thereof on either side thereof, and a rear door for said projector box adapted to maintain said film in projecting position when the door is closed.

4. In a projector, an exterior casing, a removable interior casing spaced therefrom, and a filler in each of the forward and rearward corners of the interior casing engaging with the exterior casing to maintain the exterior and the interior casing in spaced relationship one with the other casing to permit the passage of air through both casings and between said casings.

5. In a projector, an exterior one-piece folded casing, an interior casing, reinforcing members on the exterior of the rearward edges of the interior casing to maintain it in spaced relationship with respect to the exterior casing, said interior casing having top and bottom ventilation openings and said exterior casing having side and top ventilation openings whereby a current of air may pass between said casings and through them, means to close the rear of both casings comprising a hinged door on the exterior casing, means to support an electric lamp in said casings comprising a socket and electric terminal connections supported on the exterior casing front wall, a lens tube mounted on the exterior casing front wall above said lamp, a lens in said lens tube, and means for supporting the ends of a strip of film on either side of said casing, said film being arranged to pass through said casing beneath said rear door.

6. In a projector, an exterior one-piece folded casing, an interior casing, reinforcing members on the exterior of the rearward edges of the interior casing to maintain it in spaced relationship with respect to the exterior casing, said interior casing having top and bottom ventilation openings and said exterior casing having side and top ventilation openings whereby a current of air may pass between said casings and through them, means to close the rear of both casings comprising a hinged door on the exterior casing, means to support an electric lamp in said casings comprising a socket and electric terminal connections supported on the exterior casing front wall, a lens tube mounted on the exterior casing front wall above said lamp, a lens in said lens tube, and means for supporting the ends of a strip of film on either side of said casing, said film being arranged to pass through said casing beneath said rear doors, said means comprising detachable U-shaped clips for supporting the spindles on which the film is mounted, and means for actuating said spindles.

7. In combination, in a projection apparatus, of an exterior casing closed on all sides and having ventilation openings at the top and sides, and a rear hinged door, a lens tube and lens slidably mounted in the front thereof projecting beyond the front and into the interior, a lamp and lamp socket mounted on the front thereof located on the interior of the casing, and a removable interior casing spaced from the exterior casing having top and bottom ventilation openings, corner reinforcements, and means for supporting a film exterior of the casing so that it will pass through the casing beneath the rear door, into the rear thereof.

8. In combination, in a projection apparatus, of an exterior casing closed on all sides and having ventilation openings at the top and sides, and a rear hinged door, a lens tube and lens slidably mounted in the front thereof projecting beyond the front and into the interior, a lamp and lamp socket mounted on the front thereof located on the interior of the casing, and an interior casing spaced from the exterior casing having top and bottom ventilation openings, and means for supporting a film exterior of the casing so that it will pass through the casing beneath the rear door into the rear thereof, and means to reinforce and space the exterior and interior casings one from the other, and means for supporting said film on spindles from said reinforcing means.

9. In combination, in a projection apparatus, of an exterior casing closed on all sides and having ventilation openings at the top and sides, and a rear hinged door, a lens tube and lens slidably mounted in the front thereof projecting beyond the front and into the interior, a lamp and lamp socket mounted on the front thereof located on the interior of the casing, and an interior casing spaced from the exterior casing having top and bottom ventilation openings, and means for supporting a film exterior of the casing so that it will pass through the casing beneath the rear door into the rear thereof, and means to reinforce and space the exterior and interior casings one from the other, and means for supporting said film on spindles from said reinforcing means comprising detachable metal clips supporting the axles of the spindles on which the film is wound and unwound.

HENRY B. WATKINS.